US009316273B2

(12) United States Patent
Saka et al.

(10) Patent No.: US 9,316,273 B2
(45) Date of Patent: Apr. 19, 2016

(54) TORQUE CONVERTER

(75) Inventors: Tokimori Saka, Hiroshima (JP); Norio Iwashita, Hiroshima (JP); Takashi Ishiyama, Higashihiroshima (JP); Hidetoshi Maeta, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 28 days.

(21) Appl. No.: 13/817,798

(22) PCT Filed: Jul. 21, 2011

(86) PCT No.: PCT/JP2011/004117
§ 371 (c)(1),
(2), (4) Date: Feb. 19, 2013

(87) PCT Pub. No.: WO2012/023235
PCT Pub. Date: Feb. 23, 2012

(65) Prior Publication Data
US 2013/0140123 A1      Jun. 6, 2013

(30) Foreign Application Priority Data

Aug. 20, 2010 (JP) ................. 2010-184901

(51) Int. Cl.
| F16D 39/00 | (2006.01) |
| F16H 45/02 | (2006.01) |
| F16F 15/12 | (2006.01) |

(52) U.S. Cl.
CPC ............... *F16D 39/00* (2013.01); *F16H 45/02* (2013.01); *F16F 15/12* (2013.01); *F16H 2045/021* (2013.01); *F16H 2045/0284* (2013.01)

(58) Field of Classification Search
USPC ................................. 192/3.28, 3.3
See application file for complete search history.

(56) References Cited

U.S. PATENT DOCUMENTS 2,676,497 A * 4/1954 Gustav .................... F16H 47/06
                                                      192/3.24
4,588,058 A * 5/1986 Aliouate ................. F16H 45/02
                                                      192/214.1
(Continued)

FOREIGN PATENT DOCUMENTS

CN   101230906 A   7/2008
CN   101341355 A   1/2009
(Continued)

OTHER PUBLICATIONS

An Office Action, "Notice of Reasons for Rejection," issued by the Japanese Patent Office on Sep. 20, 2013, which corresponds to Japanese Patent Application No. 2010-184901 and is related to U.S. Appl. No. 13/817,798; with English Summary.
(Continued)

*Primary Examiner* — Mark Manley
(74) *Attorney, Agent, or Firm* — Studebaker & Brackett PC

(57) ABSTRACT

Provided is a torque converter (1) which comprises: a casing (10) coupled to an output shaft of an engine; a torus (T) defined by a pump (20), a turbine (30) and a stator (40) each disposed within the casing (10); a multi-plate lockup clutch (60) adapted to directly couple the turbine (30) and the casing (10); and a lockup damper (70) adapted to absorb shock during engagement of the lockup clutch (60). The lockup clutch (60) and the lockup damper (70) are arranged within a space between the torus (T) and a surface of the casing (10) on the side of the engine, in an axially overlapping relation. The lockup clutch (60) is disposed on a radially inner side with respect to a widest region (T1) of the torus (T), and the lockup damper (70) is disposed on a radially outer side with respect to the widest region (T1). This makes it possible to engage the lockup clutch (60) with excellent response while suppressing shock, and shorten an overall length of an automatic transmission.

19 Claims, 5 Drawing Sheets

(56) References Cited

U.S. PATENT DOCUMENTS

| | | | | |
|---|---|---|---|---|
| 5,029,087 | A * | 7/1991 | Cowan | F16H 61/143 |
| | | | | 192/3.3 |
| 8,215,470 | B2 * | 7/2012 | Ishikawa | F16D 25/0638 |
| | | | | 192/113.34 |
| 2001/0008198 | A1 | 7/2001 | Maienschein et al. | |
| 2002/0125093 | A1 | 9/2002 | Maienschein et al. | |
| 2005/0211523 | A1 * | 9/2005 | Takahashi | 192/3.29 |
| 2007/0007095 | A1 * | 1/2007 | Tsukamoto | F16D 25/0638 |
| | | | | 192/3.29 |
| 2007/0137962 | A1 | 6/2007 | Sturgin et al. | |
| 2007/0181395 | A1 * | 8/2007 | Mueller et al. | 192/3.29 |
| 2008/0121484 | A1 * | 5/2008 | Degler | 192/3.28 |
| 2008/0173510 | A1 | 7/2008 | Saka | |
| 2008/0173512 | A1 * | 7/2008 | Kaneko et al. | 192/3.29 |
| 2009/0183962 | A1 | 7/2009 | Nakamura | |
| 2010/0059324 | A1 * | 3/2010 | Biermann | F16D 25/0638 |
| | | | | 192/3.29 |
| 2010/0126816 | A1 * | 5/2010 | Takei et al. | 192/3.29 |
| 2010/0178172 | A1 | 7/2010 | Yamashita | |
| 2011/0086739 | A1 * | 4/2011 | Kajigai et al. | 477/5 |
| 2012/0221219 | A1 * | 8/2012 | Murata | F16H 61/14 |
| | | | | 701/60 |

FOREIGN PATENT DOCUMENTS

| | | |
|---|---|---|
| CN | 101356390 A | 1/2009 |
| CN | 101487524 A | 7/2009 |
| JP | 2000-002312 A | 1/2000 |
| JP | 2003-021219 A | 1/2003 |
| JP | 2005-155821 A | 6/2005 |
| JP | 2007-177969 A | 7/2007 |
| JP | 2007-271053 A | 10/2007 |
| JP | 2008-075843 A | 4/2008 |
| JP | 2008-175338 A | 7/2008 |
| JP | 2009-058105 A | 3/2009 |

OTHER PUBLICATIONS

International Search Report; PCT/JP2011/004117; Oct. 25, 2011.

The Notification; "The Preissuance Submission by Third Party," issued by the Japanese Patent Office on Mar. 11, 2014, which corresponds to Japanese Patent Application No. 2010-184901 and is related to U.S. Appl. No. 13/817,798; with English Summary.

The first Office Action issued by the Chinese Patent Office on Jan. 6, 2015, which corresponds to Chinese Patent Application No. 201180040179.8 and is related to U.S. Appl. No. 13/817,798; with English language summary.

* cited by examiner

TORQUE CONVERTER

TECHNICAL FIELD

The present invention relates to a torque converter of an automatic transmission designed to be mounted in a vehicle and, more particular, to a torque converter having a lockup clutch and a lockup damper, and belongs to the technical field of vehicle transmissions.

BACKGROUND ART

A torque converter incorporated in an automatic transmission to transmit an engine power output to a speed change mechanism comprises a pump adapted to be rotated integrally with a crankshaft of an engine, a turbine disposed opposed to the pump and adapted to be driven by the pump through fluid, and a stator disposed between the pump and the turbine and adapted to perform a torque amplifying function. In order to improve engine fuel economy, the torque converter may further comprise a lockup clutch adapted to be engaged so as to directly couple the pump and the turbine, except when the torque amplifying function is utilized, such as during vehicle starting, and when it is necessary to permit a relative rotation between the pump and the turbine, such as during speed changing. In this case, a lockup damper is provided on an input or output side of the lockup clutch to absorb shock during engagement of the lockup clutch.

As the torque converter having the above structure, there is a type disclosed in the following PTL 1. In this torque converter, a lockup clutch is disposed between a front cover defining a surface of a casing on the side of an engine and a turbine provided within the casing, and a lockup damper is disposed on a rear side of an outermost peripheral portion of the lockup clutch. Further, a damper spring of the lockup damper is disposed on the side of an outer circumference of the turbine, so that, as compared to cases where they are arranged in axially side-by-side relation, an axial dimension of the torque converter is suppressed.

However, in the torque converter disclosed in the PTL 1, the lockup clutch is a single plate type, which involves problems, such as limits to torque transmission capacity, and deterioration in controllability due to an increase in diameter of a clutch plate. Therefore, in recent years, a torque converter using a multi-plate type as a lockup clutch has been put to practical use, as disclosed in the following PTL 2.

In a torque converter disclosed in the PTL 2, a lockup damper is disposed in an outermost peripheral region of a space between a front cover and a turbine, and a multi-plate lockup clutch is disposed on an inner peripheral side of the space with respect to the lockup damper. Further, the lockup damper and the lockup clutch are arranged in an axially overlapping manner, so that an axial dimension of the torque converter is suppressed even using the multi-plate lockup clutch which has an axial dimension greater than that of the single plate type.

CITATION LIST

Patent Literature

[PTL 1]
JP 2003-021219A
[PTL 2]
JP 2008-175338A

SUMMARY OF INVENTION

Technical Problem

However, in the torque converter disclosed in the PTL 2, the multi-plate lockup clutch having a relatively large axial dimension is disposed adjacent to a region having a largest axial dimension (widest region) in a torus (a doughnut-shaped fluid working section for causing fluid to circulate therearound) within a casing, so that these dimensions are added to inevitably cause an increase in axial dimension of an outer peripheral portion of the torque converter. In this case, an overall length of an automatic transmission is also increased. Thus, particularly in a FF (front-engine front-wheel drive) vehicle where an engine is disposed to allow an axial direction thereof to be oriented in a widthwise direction of a vehicle body, mountability of the automatic transmission to the vehicle body will be deteriorated.

It is therefore an object of the present invention to provide a multi-plate lockup clutch-equipped torque converter capable of realizing an automatic transmission having excellent mountability to a vehicle body.

Solution to Problem

In order to achieve the above object, the present invention provides a torque converter characterized by the following feature.

A torque converter of the present invention comprises: a casing coupled to an output shaft of an engine; a pump disposed within the casing and adapted to be rotated integrally with the casing; a turbine disposed opposed to the pump from a side of the engine with respect to the pump; a stator disposed between the pump and the turbine; a multi-plate lockup clutch adapted to directly couple the turbine and the casing; and a lockup damper adapted to absorb shock during engagement of the lockup clutch. Within the casing, the pump, the turbine and the stator define a torus which serves as a fluid working section for causing fluid within the casing to circulate therearound. The lockup clutch and the lockup damper are arranged within a space between the torus and a surface of the casing on the side of the engine, in an axially overlapping relation. The lockup clutch is disposed on a radially inner side with respect to a widest region of the torus where an axial dimension of the torus becomes largest, and the lockup damper is disposed on a radially outer side with respect to the widest region.

DESCRIPTION OF EMBODIMENTS

The present invention will now be described based on an embodiment thereof.

Figure 1:
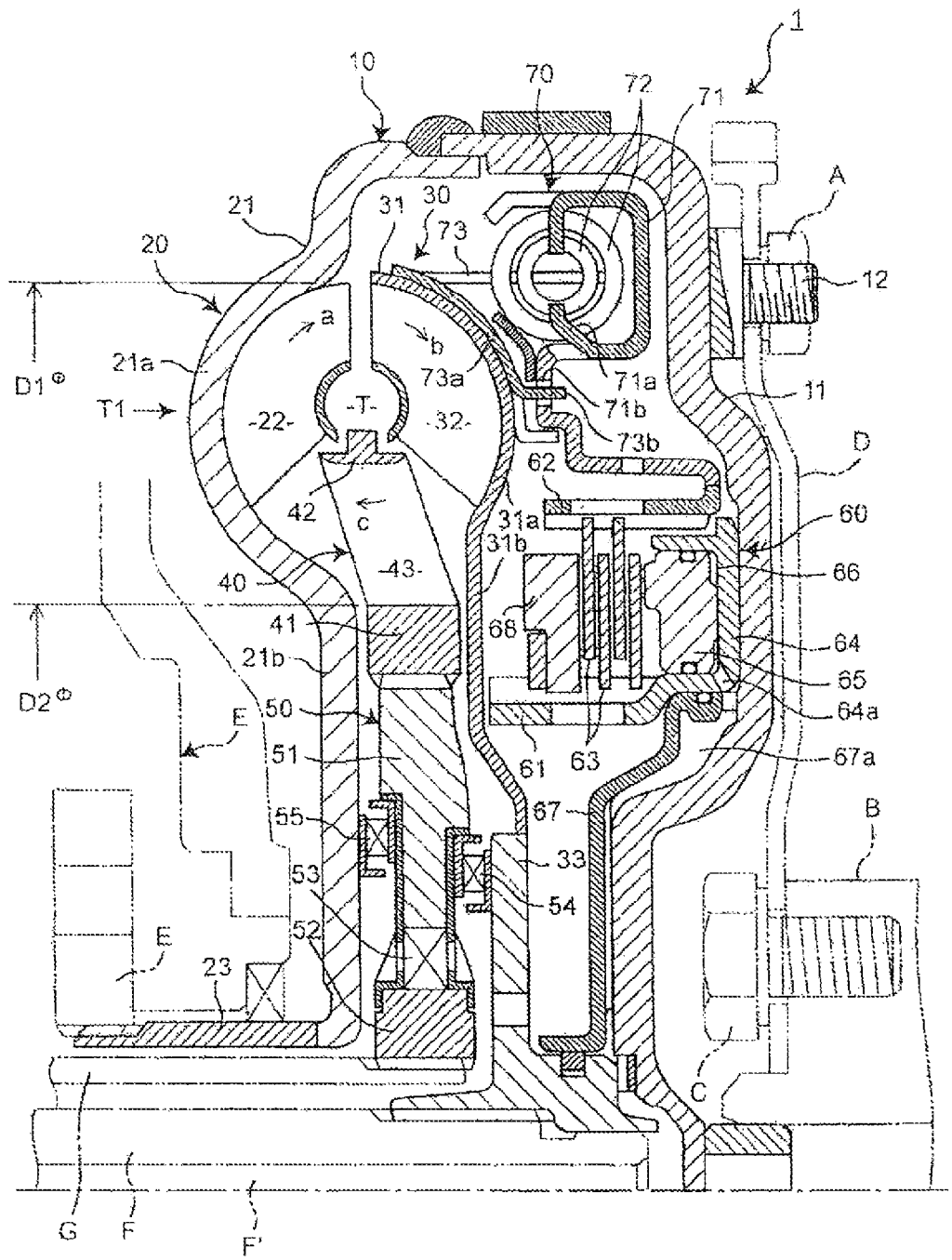
FIG. 1 is a sectional view of a torque converter according to a first embodiment of the present invention.

FIG. 1 illustrates a torque converter according to a first embodiment of the present invention. This torque converter 1 comprises a casing 10 which forms an outer shell of the torque converter 1. The casing 10 has a front cover 11 which makes up a half of the casing 10 on the side of an engine, and a plurality of stud bolts 12 are fixedly provided on an outer peripheral portion of the front cover 11. On the other hand, a drive plate D is attached to an end of a crankshaft B of the engine through a crank bolt C. The stud bolt 12 is inserted into an outer peripheral portion of the drive plate D. Then, a nut A is screwed onto the inserted stud bolt 12, so that the entire torque converter 1 is coupled to the crankshaft B through the stud bolt 12, the nut A and the drive plate D. When the crankshaft B is rotated during operation of the engine, the front cover 11 is rotationally driven integrally with the crankshaft B.

In the following description, one side closer to the engine (right side in drawings) will be referred to as "front" or "frontward", and the other side (left side in drawings) farther away from the engine will be referred to as "rear" or "rearward", for the sake of convenience.

As primary components, the torque converter 1 comprises a pump 20, a turbine 30, a stator 40, a one-way clutch 50, a lockup clutch 60, and a lockup damper 70. These components are housed in the casing 10, and an internal space of the casing 10 is filled with fluid.

The pump 20 comprises a pump shell 21 which makes up a rear half of the casing 10, and a large number of blades 22 provided on an outer peripheral portion of the pump shell 21. Specifically, the outer peripheral portion of the pump shell 21 is formed to have a rearwardly bulging curved portion 21a, and the large number of blades 22 are arranged on an inner surface of the curved portion 21a in circumferentially side-by-side relation at even intervals. Thus, when the pump shell 21 and the blades 22 are rotated integrally with the front cover 11, the fluid filled in the casing 10 (the front cover 11 and the pump shell 21) is moved while being guided by the blades 22 and the inner surface of the curved portion 21a. Consequently, a fluid flow "a" oriented toward an outer peripheral side and a frontward side while swirling about an axis of the pump shell 21 (casing 10) will be generated.

The pump shell 21 has an inner peripheral end provided with a sleeve 23 which extends rearwardly in such a manner that a distal end of the sleeve 23 is engaged with an inner gear E' of a gear-type oil pump E disposed rearward of the torque converter 1. Thus, when the crankshaft B is rotated, the rotation is transmitted to the oil pump E through the casing 10 and the sleeve 23, so that the oil pump E is driven.

The turbine 30 comprises a turbine shell 31, a large number of blades 32 provided on an outer peripheral portion of the turbine shell 31, and a turbine hub 33 joined to an inner peripheral end of the turbine shell 31 by means of welding. Specifically, the outer peripheral portion of the turbine shell 31 is formed to have a curved portion 31a convexedly curving in a direction opposite to that of the curved portion 21a of the pump shell 21 (in a frontward direction), and the large number of blades 32 are arranged on an inner surface of the curved portion 31a in circumferentially side-by-side relation at even intervals. This turbine 30 (the turbine shell 31, the blades 32, the turbine hub 33) is disposed frontward of the pump 20, and rotatably housed in the casing 10.

Based on the arrangement where the curved portion 31a of the turbine shell 31 provided with the blades 32 is disposed opposed to the curved portion 21a of the pump shell 21 provided with the blades 22, the flow "a" generated by the rotation of the pump 20 is introduced into the curved portion 31a of the turbine shell 31. The fluid introduced into the curved portion 31a is converted to a flow "b" oriented toward an inner peripheral side (radially inner side), by the blades 32 and the inner surface of the curved portion 31a. In this process, the flow "b" pushes the blades 32, so that the turbine 30 is driven in the same direction as that of the pump 20 while receiving a force in the circumferential direction. The drive force of the turbine 30 is transmitted to a speed change mechanism of an automatic transmission through a turbine shaft F spline-fitted to an inner peripheral end of the turbine hub 33.

The stator 40 integrally has an inner race portion 41, an outer race portion 42 provided on an outer peripheral side with respect to the inner race portion 41, and a large number of blades 43 provided between the inner race portion 41 and the outer race portion 42 to extend in a radial pattern. The large number of blades 43 are arranged between each of inner peripheral ends of the blades 22 of the pump 20 and a corresponding one of inner peripheral ends of the blades 32 of the turbine 30, in circumferentially side-by-side relation at even intervals. Thus, the fluid flow "b" driving the turbine 30 is introduced rearwardly from the turbine 30, and converted to a flow "c" passing through between adjacent ones of the blades 43.

Then, the flow "c" is introduced into the curved portion 21a of the pump shell 21 from an inner peripheral side thereof, and converted to the flow "a". In this manner, a fluid flow circulating through between respective adjacent ones of the blades 22, 32, 43 of the pump 20, the turbine 30 and the stator 40, is formed. In other words, a doughnut-shaped fluid working section for causing the fluid within the torque converter 1 to circulate therearound, i.e., a torus T, is defined by the pump 20, the turbine 30 and the stator 40.

The one-way clutch 50 is designed to support the stator 40 so as to realize a torque amplifying function based on the stator 40, wherein it comprises an outer race 51, an inner race 52, and a plurality of sprags 53 interposed between the inner and outer races 51, 52. The outer race 51 has an outer peripheral edge surface which is spline-fitted with an inner peripheral edge surface of the inner race portion 41 of the stator 40, and the inner race 52 has an inner peripheral edge surface which is spline-fitted with a distal end of an oil pump sleeve G as a part of a transmission housing of the automatic transmission, and thereby fixed to the transmission housing.

An axial position of the outer race 51 is restricted by a thrust bearing 54 provided between the outer race 51 and the turbine hub 33 located frontward thereof, and a thrust bearing 55 provided between the outer race 51 and an inner peripheral portion of the pump shell 21 located rearward thereof, so that the stator 40 is axially positioned with respect to the pump 20 and the turbine 30.

Thus, when a pushing force based on the fluid flow "c" acts on one of opposite surfaces of each of the blades 43 and thereby the stator 40 receives a rotational force in one direction, the one-way clutch 50 runs idle to allow the stator 40 to be freely rotated. On the other hand, when the pushing force acts on the other surface of each of the blades 43 and thereby the stator 40 receives a rotational force in the other direction, the one-way clutch 50 is locked to immobilize the stator 40. In this process, the torque amplifying function is exhibited to amplify torque input from the engine into the pump 20. The amplified torque is output from the turbine 30 to the turbine shaft F.

Figure 2:
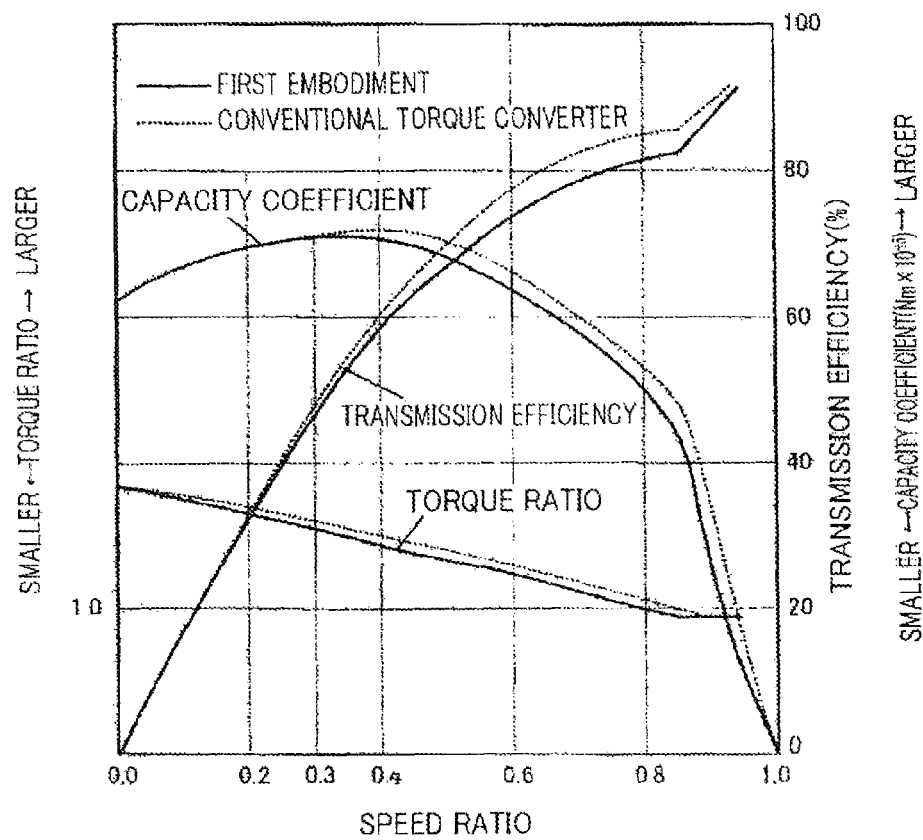
FIG. 2 is a graph illustrating characteristics of the torque converter, in a manner compared to a conventional torque converter.

In this case, generally, a torque amplifying function providing a torque ratio of 1 or more is obtained when a speed ratio is in the range of 0 to 0.8 or 0.9, wherein the torque ratio (torque amplification ratio) becomes largest when the speed ratio is 0 (see FIG. 2).

The lockup clutch 60 comprises: a clutch hub 61 and a clutch drum 62 which are concentrically arranged; a plurality of friction plates 63 arranged between the clutch hub 61 and the clutch drum 62 and alternately engaged therewith; and a piston 65 slidably received in a piston cylinder 64 provided integrally with the clutch hub 61. The clutch hub 61 and the piston cylinder 64 are fixedly attached onto an inner surface of the front cover 11 by means of welding.

The piston cylinder 64 has an oil pressure chamber 66 defined on a back side of the piston 65. A working oil pressure is introduced from an oil hole F provided in the turbine shaft F into the oil pressure chamber 66, through an oil passage 67a defined between the front cover 11 and a plate member 67 fixedly attached onto the inner surface of the front cover 11, an oil hole 64a provided in the piston cylinder 64, etc. When the working oil pressure is introduced into the oil pressure chamber 66 in the above manner, the plurality of friction plates 63 are pressed toward a retainer 68 by the piston 65, and thereby the lockup clutch 60 is engaged.

The lockup damper 70 comprises a spring retainer plate 71, and a plurality of damper springs 72 each disposed to circumferentially extend along the spring retainer plate 71. The spring retainer plate 71 is provided with a spring catching portion 71a which catches one end of each of the damper springs 72, and the outer peripheral portion of the turbine shell 31 is fixedly provided with a spring catching member 73, wherein the spring catching member 73 protrudes frontwardly from an outer surface of the turbine shell 31 so as to catch the other end of each of the damper springs 72.

The spring retainer plate 71 has an inner peripheral portion joined to the drum 62 of the lockup clutch 60. Thus, when the lockup clutch 60 is engaged, the rotation of the front cover 11, i.e., the rotation of the crankshaft B, is input into the spring retainer plate 71 of the lockup damper 70 through the lockup clutch 60, and the force input into the spring retainer plate 71 is transmitted from the spring catching member 73 to the turbine 30 while compressing the damper springs 72.

The spring catching member 73 has a stopper portion 73b which protrudes frontwardly from an inner peripheral end of a base portion 73a fixedly attached onto the turbine shell 31. The stopper portion 73b is inserted into a circumferentially-long elongate hole 71b provided in the spring retainer plate 71. This makes it possible to restrict a relative rotation between the spring catching member 73 and the spring retainer plate 71 to a given distance so as to prevent excessive compression of the damper springs 72.

An operation of the torque converter 1 according to the first embodiment will be described below. In a non-engagement state of the lockup clutch 60, such as during vehicle starting and during speed changing, the turbine 30 is driven by the pump 20 rotated integrally with the crankshaft B of the engine, through the fluid circulating within the torus T, so that driving force is transmitted to the speed change mechanism through the turbine shaft F. In this process, in a converter region having a speed ratio equal to or less than about 0.8 to 0.9, engine output torque is amplified by the torque amplifying function of the stator 40, and then output to the speed change mechanism.

On the other hand, in an operating state other than during vehicle starting and during speed changing, when a working oil pressure is supplied from the oil hole F provided in the turbine shaft F to the oil pressure chamber 66 of the lockup clutch 60 through the oil passage 67a, the oil hole 64a, etc., the lockup clutch 60 is engaged, and the front cover 11 of the casing 10 and the turbine 30 are coupled through the lockup damper 70. Then, engine output torque is transmitted from the crankshaft B to the turbine 30 through the casing 10, the lockup clutch 60 and the lockup damper 70 in a direct manner (lockup mode). In the lockup mode, engine output torque is transmitted to the speed change mechanism without through fluid, so that torque transmission efficiency is improved as compared to that in the non-engagement state of the lockup clutch 60, to provide improved engine fuel economy.

In order to suppress shock during engagement of the lockup clutch 60, during an operation of engaging the lockup clutch 60, an oil pressure to be supplied to the oil pressure chamber 66 is controlled to allow the lockup clutch 60 to be set in a slip mode once, and then fully engaged. In this case, when the plurality of friction plates 63 of the lockup clutch 60 start coming into contact with each other to initiate torque transmission, the damper springs 72 of the lockup damper 70 are compressed to absorb shock in an initial stage of torque transmission, so that the lockup clutch 60 will be smoothly engaged.

An arrangement, a dimensional relationship, etc., of the components of the torque converter 1 according to the first embodiment, and corresponding advantageous effects, will be described below.

The lockup clutch 60 is disposed in a radially intermediate region of a space between the front cover 11 and the turbine shell 31 and on a radially inner side with respect to the curved portion 31a of the turbine shell 31. The lockup damper 70 is disposed in an outer peripheral region of the space and on a radially outer side with respect to the curved portion 31a of the turbine shell 31.

In other words, the lockup clutch 60 and the lockup damper 70 are distributedly arranged, respectively, on a radially inner side and a radially outer side of a widest region T1 of the torus T, in an axially overlapping relation with each other. As used here, the term "widest region T1" of the torus T means a region of the torus T where an axial dimension (width in a frontward-rearward direction) between the curved portion 31a of the turbine shell 31 and the curved portion 21a of the pump shell 21 located opposed to the curved portion 31a becomes largest.

Thus, as compared to cases where the lockup clutch 60 and the lockup damper 70 are not arranged in axially overlapping relation, an axial dimension of the torque converter 1 can be shortened, and the lockup clutch 60 and the lockup damper 70 can be disposed axially closer to the torus T. In addition, as illustrated in FIG. 1, the clutch hub 61 is disposed to allow a rear end thereof to protrude toward a depressed portion 31b of the turbine shell 31 formed on an inner peripheral side with respect to the curved portion 31a, and the damper spring 72 is disposed obliquely outward of the curved portion 31a of the turbine shell 31. In this case, the lockup clutch 60 and the lockup damper 70 can be disposed to partially overlap the torus T, so that the axial dimension of the torque converter 1 or an overall length of the automatic transmission can be more effectively shortened.

Particularly, in the first embodiment, installation positions of the lockup clutch 60 and the lockup damper 70 are distributedly set on inward and outward sides in such a manner that the lockup clutch 60 is disposed on the radially inner side with respect to the widest region T1 of the torus T, and the lockup damper 70 is disposed on the radially outer side with respect to the widest region T1. Thus, as mentioned above, the shock absorbing effect during engagement of the lockup clutch 60 can be enhanced, and a slip control in an initial stage of the operation of engaging the lockup clutch 60 can be performed with excellent response and accurately, so that shock during engagement of the lockup clutch will be effectively suppressed.

A feature of the torque converter 1 according to the first embodiment will be described based on dimensions thereof in design. Given that an outer diameter of the torus T for causing fluid within the torque converter 1 to circulate therearound (a diameter of a circle at outward edges of the blades 22, 32 of the pump 20 and the turbine 30) is D1, and an inner diameter of a flow passage of he torus T (a diameter of a circle at base ends of the blades 43 of the stator 40) is D2, a dimensional relation between the outer and inner diameters D1, D2 in the torque converter 1 is set as follows:

$D1 = 246$ mm $D2 = 158$ mm $D1/D2 = 1.56$

In a conventional torque converter, the ratio D1/D2 of the outer diameter D1 to the inner diameter D2 of the torus T is set to about 2 or to 2 or more. Thus, in the torque converter 1 according to the first embodiment, the ratio D1/D2 is set to a smaller value than that of the conventional torque converter.

Specifically, the outer diameter D1 of the torus T is set correspondingly to a rated power output of an engine to which a torque converter is applied. Thus, in the torque converter 1 according to the first embodiment, the inner diameter D2 of the torus T is larger than that of a conventional torque converter to be applied to an engine having a similar rated power output (i.e., a conventional torque converter having approximately the same outer diameter D1), i.e., the torus T becomes thinner.

Therefore, in the torque converter 1, design flexibility in a region on the radially inner side with respect to the torus T is improved, so that the lockup clutch 60 to be located on the radially inner side with respect to the widest region T1 of the torus T can be disposed to axially partially overlap the torus T, as mentioned above, and the inner peripheral portion of the pump shell 21 can be formed as a depressed portion 21b depressed frontwardly.

Based on forming the inner peripheral portion of the pump shell 21 as the depressed portion 21b, the oil pump E located rearward of the depressed portion 21b can be disposed closer to the engine. This also contributes to shortening the overall length of the automatic transmission.

Meanwhile, if the ratio D1/D2 of the outer diameter to the inner diameter of the torus T is set to a smaller value, an amount of fluid circulating within the torus T is reduced, and thereby characteristics, such as capacity coefficient, transmission efficiency and torque ratio, will be deteriorated, as compared to a conventional torque converter, as shown in FIG. 2.

In the conventional torque converter illustrated in FIG. 2, inner and outer diameters of a torus T are set to have the following dimensional relationship:

$D1 = 236$ mm $D2 = 99$ mm $D1/D2 = 2.38$

However, as is clear from FIG. 2, each of the capacity coefficient and the transmission efficiency becomes less than that of the conventional torque converter when the speed ratio is in the range of about 0.3 or more. Thus, an influence on vehicle start and acceleration performance, etc., due to the small capacity coefficient and transmission efficiency, can be effectively avoided by starting an engagement control (slip control) of the lockup clutch 60 in an operating range having a relatively small speed ratio, such as during vehicle starting.

Further, if the engagement control of the lockup clutch 60 is started in the operating range having a small speed ratio, the shock becomes larger. This problem can also be avoided by improving a shock absorbing effect based on the arrangement where the lockup clutch 60 is disposed on the radially inner side and the lockup damper 70 is disposed on the radially outer side, as mentioned above.

The deterioration in the torque ratio can be solved, for example, by employing a multi-speed type automatic transmission, such as forward 6-speed type. Specifically, in the multi-speed type automatic transmission, a speed reduction ratio in a low speed stage can be set to a large value. Thus, excellent vehicle start and acceleration performance can be maintained by applying the torque converter 1 according to the first embodiment to such a multi-speed type automatic transmission.

As above, in the torque converter 1 according to the first embodiment, an overall length of an automatic transmission can be effectively shortened. In addition, the engagement of the lockup clutch 60 can be started in an operation range having a relatively small speed ratio without causing an increase in shock during the engagement of the lockup clutch 60, so that it becomes possible to improve engine fuel economy while avoiding deterioration in vehicle start and acceleration performance.

A second embodiment of the present invention will be described below.

Figure 3:
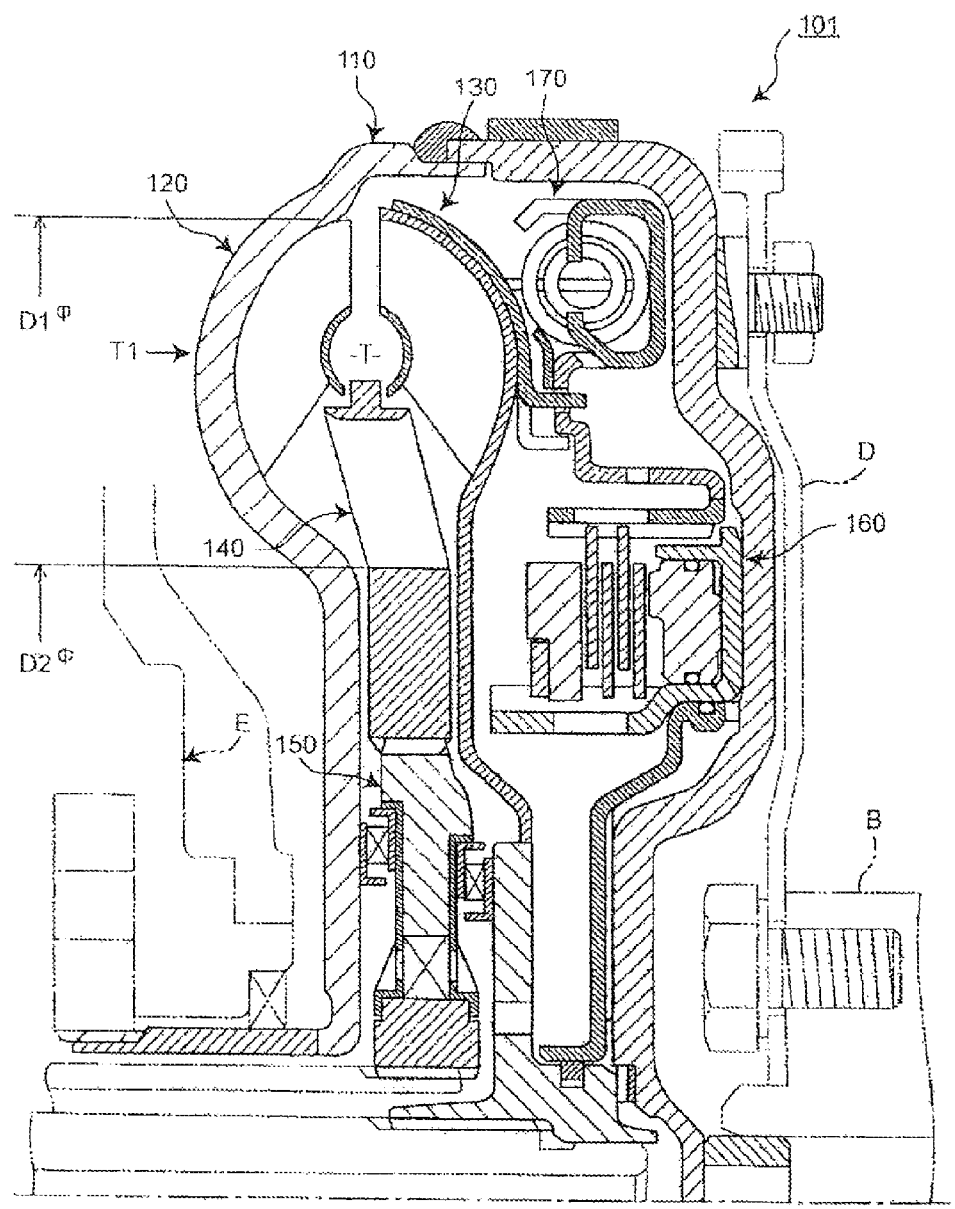
FIG. 3 is a sectional view of a torque converter according to a second embodiment of the present invention.

In terms of components, the second embodiment is the same as the first embodiment. Specifically, as illustrated in FIG. 3, a torque converter 101 according to the second embodiment comprises a casing 110 which forms an outer shell of the torque converter 101. The casing 110 is coupled to an end of a crankshaft B through a drive plate D. As primary components, the torque converter 101 comprises a pump 120, a turbine 130, a stator 140, a one-way clutch 150, a lockup clutch 160, and a lockup damper 170, and these components are housed in the casing 110.

In terms of respective structures and an arrangement of the components 110 to 170, the second embodiment is also the same as the first embodiment.

Specifically, in the torque converter 101 according to the second embodiment, the lockup clutch 160 and the lockup damper 170 are distributedly arranged, respectively, on a radially inner side and a radially outer side of a widest region T1 of a torus T, in an axially overlapping relation with each other. Thus, as with the torque converter 1 according to the first embodiment, an axial dimension of the torque converter 101 or an overall length of an automatic transmission can be more effectively shortened.

Further, installation positions of the lockup clutch 160 and the lockup damper 170 are distributedly set on inward and outward sides in such a manner that the lockup clutch 160 is disposed on the radially inner side with respect to the widest region T1 of the torus T, and the lockup damper 170 is disposed on the radially outer side with respect to the widest region T1. Thus, as with the first embodiment, a shock absorbing effect during engagement of the lockup clutch 160 can be enhanced, and a slip control in an initial stage of an operation of engaging the lockup clutch 160 can be performed with excellent response and accurately, so that shock during engagement of the lockup clutch will be effectively suppressed.

In the torque converter 101 according to the second embodiment, a dimensional relationship between inner and outer diameters D1, D2 of the torus T is set as follows:

$D1 = 265$ mm $D2 = 170$ mm $D1/D2 = 1.56$

Specifically, the torque converter 101 according to the second embodiment is applied to an engine having a rated power output greater than that of the engine for the torque converter 1 according to the first embodiment. Thus, the outer diameter D1 of the torus T is greater than that in the torque converter 1 according to the first embodiment, and the inner diameter D2 is set to a larger value accordingly. As a result, a ratio of the outer diameter D1 to the inner diameter D2 becomes equal to that in the torque converter 1 according to the first embodiment.

Thus, in the torque converter 101 according to the second embodiment, the overall length of the automatic transmission can be more effectively shortened. In addition, the engagement of the lockup clutch 160 can be started in an operation range having a relatively small speed ratio without causing an increase in shock during the engagement of the lockup clutch 160, so that it becomes possible to improve engine fuel economy while avoiding deterioration in vehicle start and acceleration performance.

In the torque converter 1 according to the first embodiment, the spring retainer plate 71 of the lockup damper 70, and the spring catching member 73, are joined, respectively, to the drum 62 of the lockup clutch 60, and the turbine shell 31, so that the lockup damper 70 is inserted between the lockup clutch 60 and the turbine 30 (the torque converter 101 according to the second embodiment has the same structure). Alternatively, as in a torque converter 201 illustrated in FIG. 4, a lockup damper 270 may be inserted between a front cover 211 and a lockup clutch 260.

Figure 4:
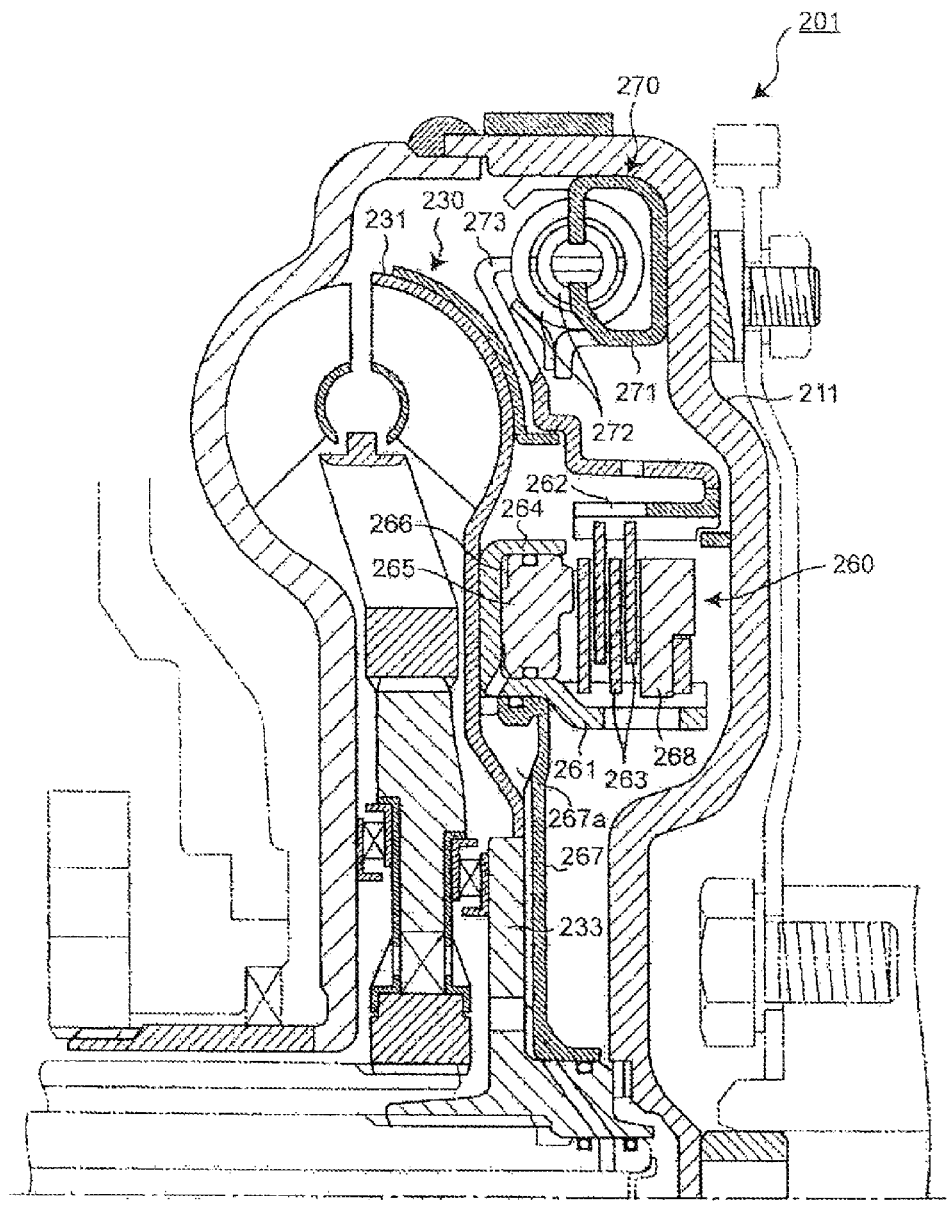
FIG. 4 is a sectional view of a torque converter according to a third embodiment of the present invention.

Specifically, in the torque converter 201 according to a third embodiment illustrated in FIG. 4, the lockup clutch 260 is disposed in a radially intermediate region of a space between the front cover 211 and a turbine shell 231, and the lockup damper 270 is disposed in an outermost peripheral region of the space. A spring retainer plate 271 for retaining a damper spring 272 of the lockup damper 270 is fixedly attached to an outermost peripheral region of an inner surface of the front cover 211 by means of welding, and a spring catching member 273 for catching one end of the damper spring 272 is coupled to a drum 262 of the lockup clutch 260.

Further, a piston cylinder 264 provided integrally with a hub 261 of the lockup clutch 260 is fixedly attached to the turbine shell 231 by means of welding. In the piston cylinder 264, an oil pressure chamber 266 is defined on a back side of a piston 265. A plate member 267 is provided on an inner peripheral side with respect to the piston cylinder 264, so that an oil passage 267*a* for supplying an oil pressure to the oil pressure chamber 266 is defined between the plate member 267 and each of the turbine hub 233 and the turbine shell 231.

Thus, in the torque converter 201, when a working oil pressure is supplied to the oil pressure chamber 266 of the lockup clutch 260, a plurality of friction plates 263 are pressed toward a retainer 268 by the piston 265, and thereby the lockup clutch 260 is engaged to couple the front cover 211 and the turbine 230. In this process, the damper spring 272 of the lockup damper 270 inserted between the front cover 211 and the lockup clutch 260 is compressed, so that shock in an initial stage of the engagement of the lockup clutch 260 will be absorbed.

In terms of an arrangement, a dimensional relationship, etc., of components other than the lockup clutch 260 and the lockup damper 270, the torque converter 201 is the same as the torque converter 1 according to the first embodiment. Thus, the torque converter 201 can obtain the same effects as those in the first embodiment.

Figure 5:
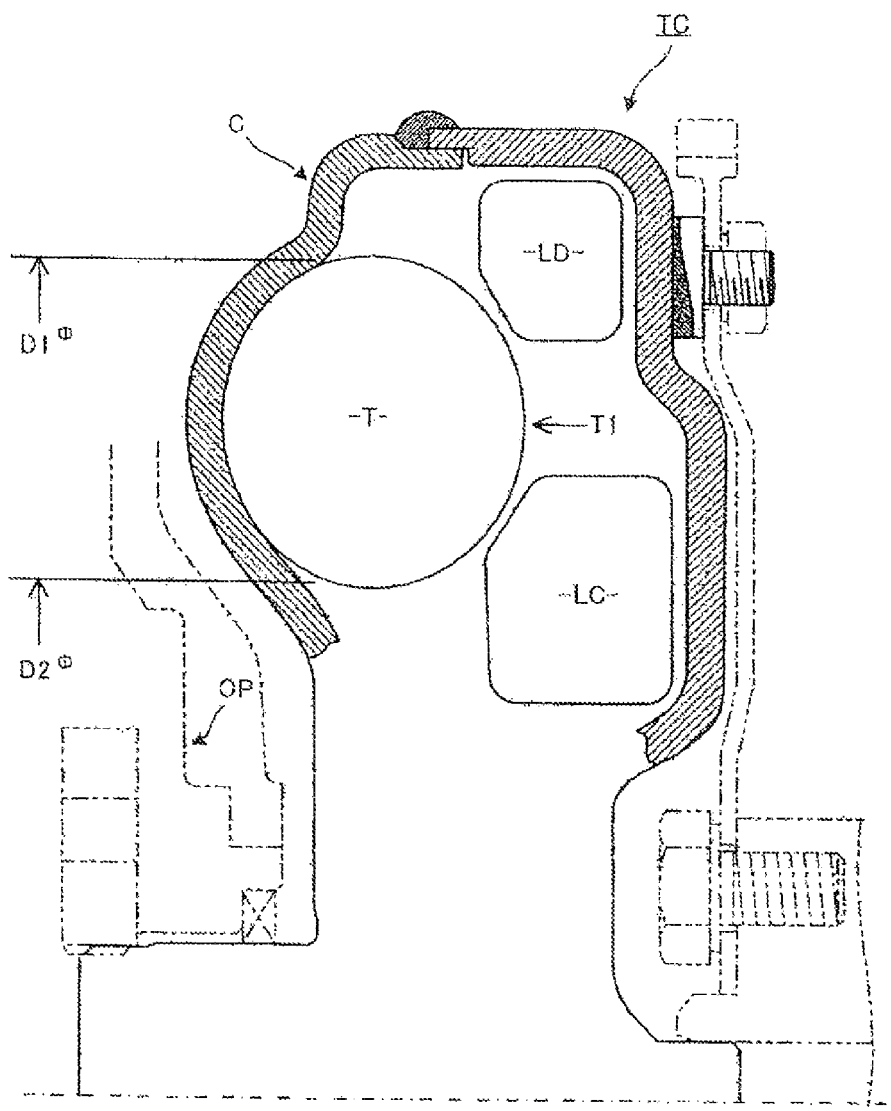
FIG. 5 is a schematic diagram illustrating a distinctive configuration of the present invention.

An outline of features and advantageous effects based on the contents of the above embodiments will be described with reference to FIG. 5.

A torque converter TC comprises: a casing C coupled to an output shaft of an engine; a pump disposed within the casing C and adapted to be rotated integrally with the casing C; a turbine disposed opposed to the pump from a side of the engine with respect to the pump; a stator disposed between the pump and the turbine; a multi-plate lockup clutch LC adapted to directly couple the turbine and the casing; and a lockup damper LD adapted to absorb shock during engagement of the lockup clutch LC. Within the casing C, the pump, the turbine and the stator define a torus T which serves as a fluid working section for causing fluid to circulate therearound. The lockup clutch LC and the lockup damper LD are arranged within a space between the torus T and a surface of the casing C on the side of the engine, in an axially overlapping relation. The lockup clutch LC is disposed on a radially inner side with respect to a widest region T1 of the torus T where an axial size of the torus T becomes largest, and the lockup damper LD is disposed on a radially outer side with respect to the widest region T1.

In the above structure, in the torque converter TC having the torus T defined within the casing C, the lockup clutch LC and the lockup damper LD are arranged within the space between the torus T and the surface of the casing C on the side of the engine, in an axially overlapping relation. Thus, as compared to cases where the lockup clutch LC and the lockup damper LD are not arranged in axially overlapping relation, an axial dimension of the torque converter TC can be shortened.

In this case, the lockup clutch LC and the lockup damper LD are distributedly arranged, respectively, on the radially inner side and the radially outer side of the widest region T1 of the torus T, so that the lockup clutch LC and the lockup damper LD can be disposed axially closer to the torus T, or can be disposed to partially overlap the torus T.

Therefore, even though the torque converter TC is equipped with the multi-plate lockup clutch LC having a long axial dimension, an axial dimension of the torque converter TC can be effectively shortened and consequently an overall length of an automatic transmission can be shortened to provide enhanced mountability of the automatic transmission to a vehicle body.

In the above structure, the lockup damper LD is disposed on the radially outer side with respect to the widest region T1 of the torus T. Thus, a length and a contraction amount of a damper spring arranged in a circumferential direction can be increased, and a centrifugal force to be applied to the damper spring is increased. Further, a frictional damping effect based on sliding contact between the spring and a spring retainer portion for retaining the spring is enhanced. Thus, as compared to cases where the lockup damper LD is disposed on a radially inner side, a shock absorbing effect of the lockup damper LD during engagement of the lockup clutch LC can be enhanced.

Further, the lockup clutch LC is disposed on the radially inner side with respect to the widest region T1 of the torus T, so that diameters of a friction plate and a piston can be reduced to facilitate a reduction in weight of the lockup clutch LC. This makes it possible to improve response to rising of an oil pressure, and thereby accurately performing control, particularly, in a slip mode just after start of an engagement operation, as compared to cases where the lockup clutch LC is disposed on a radially outer side.

Thus, the above structure makes it possible to achieve reduction in overall length of an automatic transmission and improvement in mountability of an automatic transmission to a vehicle body, and perform an engagement control of the lockup clutch LC smoothly with excellent response while suppressing shock during engagement of the lockup clutch LC.

Preferably, the torque converter TC is designed to satisfy the following relationship: D1/D2=1.5 to 1.6, wherein D1 is an outer diameter of the torus T corresponding to a rated output torque of the engine, and D2 is an inner diameter of the torus T defined by a position of a base end of a blade of the stator.

When the ratio D1/D2 of the outer diameter D1 to the inner diameter D2 of the torus T is set in the range of 1.5 to 1.6, the inner diameter D2 becomes larger as compared to a conventional torque converter having a larger ratio D1/D2 (e.g., 2 or more) on an assumption that the outer diameter D1 to be set correspondingly to a rated power output of an engine is set to a constant value.

In this case, design flexibility in a region on the radially inner side with respect to the torus T is improved. Thus, for example, the lockup clutch LC to be located on the radially inner side with respect to the widest region T1 of the torus T can be easily disposed to overlap the torus T. Further, an inner peripheral portion of a wall of the casing C farther away from the engine can be disposed closer to the engine so as to allow an oil pump located rearward of the inner peripheral portion to be disposed closer to the engine. Thus, the overall length of the automatic transmission will be more effectively shortened.

If the ratio D1/D2 is less than 1.5, an amount of fluid circulating within the torus T is reduced, and thereby characteristics of the torque converter TC, such as capacity and transmission efficiency, will be deteriorated to cause difficulty in practical use. On the other hand, if the ratio D1/D2 is greater than 1.6, the effect of shortening the overall length of the automatic transmission cannot be sufficiently obtained. From the above point of view, the ratio D1/D2 is set in the range of 1.5 to 1.6.

As described above, the present invention can realize a torque converter having excellent response and shock absorbability during engagement of a lockup clutch, and compactness. Thus, the present invention is suitably usable in the technical field of manufacturing of this type of torque converter or automatic transmission, or a vehicle mounting the automatic transmission.

The invention claimed is:
1. A torque converter comprising:
a casing coupled to an output shaft of an engine;
a pump disposed within the casing and adapted to be rotated integrally with the casing;
a turbine disposed opposed to the pump from a side of the engine with respect to the pump;
a stator disposed between the pump and the turbine;
a multi-plate lockup clutch adapted to directly couple the turbine and the casing; and
a lockup damper adapted to absorb shock during engagement of the lockup clutch,
wherein the pump, the turbine and the stator define a torus which serves as a fluid working section for causing fluid within the casing to circulate therearound, and
wherein the turbine includes a turbine shell and a plurality of blades provided on an inner surface of an outer peripheral portion of the turbine shell, a part of the outer peripheral portion of the turbine shell being convexly curved toward the engine and being a widest region of the turbine shell,
the lockup clutch and the lockup damper being arranged laterally within a space between the torus and a surface of the casing on the side of the engine,
the lockup clutch being entirely disposed on a radially inner side with respect to the widest region of the turbine shell where an axial dimension of the torus becomes largest, and the lockup damper being entirely disposed on a radially outer side with respect to the widest region of the turbine shell, and
friction plates of the lockup clutch and the lockup damper being respectively disposed adjacent to the turbine in an axial direction in such a manner that a part of the lockup clutch and the part of the outer peripheral portion of the turbine shell corresponding to the widest region being disposed to overlap with each other in an imaginary plane oriented perpendicular to a rotational axis of the lockup clutch.

2. The torque converter according to claim 1, wherein a part of the lockup damper and the part of the outer peripheral portion of the turbine shell are arranged to overlap with each other in the imaginary plane.

3. The torque converter according to claim 2, wherein the lockup damper includes a damper spring for absorbing shock during engagement of the lockup clutch, and the damper spring is disposed to overlap with the turbine shell in the imaginary plane.

4. The torque converter according to claim 3, wherein the lockup damper includes a spring catching member protruding toward the engine from an outer peripheral end of the turbine so as to catch one end of the damper spring.

5. The torque converter according to claim 4, wherein the friction plates are disposed to overlap with the damper spring in another imaginary plane oriented perpendicular to the rotational axis of the lockup clutch.

6. The torque converter according to claim 5, further comprising:
a one-way clutch for supporting the stator; and
first and second thrust bearings for restricting an axial position of the one-way clutch, the first thrust bearing being disposed closer to the engine than the second thrust bearing; wherein
the lockup clutch and the second thrust bearing are disposed on a radially outer side than the first thrust bearing.

7. The torque converter according to claim 6, wherein
the casing has a depressed portion in a radially inner part of a back wall section farther away from the engine, the depressed portion is depressed toward the engine,
the torque converter further comprising an oil pump disposed on a side farther away from the engine with respect to the depressed portion, and
the one-way clutch being disposed in a position displaced toward the engine with respect to a center of the torus.

8. The torque converter according to claim 7, wherein the casing has a bulged portion in a radially intermediate part of a wall section closer to the engine, the bulged portion bulging toward the engine more than a radially inner part of the wall section, and
wherein the lockup clutch has a piston which is driven in an axial direction by an oil pressure, the piston is disposed only within a radial range of the bulged portion,
the torque converter further comprising:
a fixed plate member attached onto an inner surface of a wall section of the casing on a radially inner side of the lockup clutch; and an oil passage formed between the wall section of the casing and the plate member so as to supply therethrough a working pressure to the piston, the fixed plate member having an outer peripheral end extending to a position within the bulged portion, and an end of the piston located furthest away from the engine being disposed closer to the engine than an end of the plate member located furthest away from the engine.

9. The torque converter according to claim 8, wherein a ratio D1/D2 is set in a range of 1.5 to 1.6, where D1 is an outer diameter of the torus, and D2 is an inner diameter of the torus, and the lockup clutch is engaged when a speed ratio is not less than 0.3 and less than 1, where the speed ratio is a ratio of a rotation speed of the turbine to a rotation speed of the pump.

10. The torque converter according to claim 9, wherein the torque convertor is applied to a forward 6-speed type automatic transmission.

11. The torque converter according to claim 10, wherein the lockup clutch includes a clutch hub and a clutch drum in addition to the piston and the friction plates, the piston is driven to press the friction plates arranged between the clutch hub and the clutch drum, and the lockup damper further includes a spring retainer plate for engaging the lockup damper with the friction plates during engagement of the lockup clutch.

12. The torque converter according to claim 1, wherein the casing has a bulged portion in a radially intermediate part of a wall section closer to the engine, the bulged portion bulging toward the engine more than a radially inner part of the wall section, and wherein the lockup clutch has a piston which is driven in an axial direction by an oil pressure, the piston is disposed only within a radial range of the bulged portion, the torque converter further comprising:

a fixed plate member attached onto an inner surface of a wall section of the casing on a radially inner side of the lockup clutch; and an oil passage formed between the wall section of the casing and the fixed plate member so as to supply therethrough a working pressure to the piston, the fixed plate member having an outer peripheral end extending to a position within the bulged portion, and an end of the piston located furthest away from the engine being disposed closer to the engine than an end of the plate member located furthest away from the engine.

13. The torque converter according to claim 12, wherein a ratio D1/D2 is set in a range of 1.5 to 1.6, where D1 is an outer diameter of the torus, and D2 is an inner diameter of the torus, and the lockup clutch is engaged when a speed ratio is not less than 0.3 and less than 1, where the speed ratio is a ratio of a rotation speed of the turbine to a rotation speed of the pump.

14. The torque converter according to claim 1, wherein a ratio D1/D2 is set in a range of 1.5 to 1.6, where D1 is an outer diameter of the torus, and D2 is an inner diameter of the torus, and the lockup clutch is engaged when a speed ratio is not less than 0.3 and less than 1, where the speed ratio is a ratio of a rotation speed of the turbine to a rotation speed of the pump.

15. A torque converter comprising:

a casing coupled to an output shaft of an engine;

a pump disposed within the casing and adapted to be rotated integrally with the casing;

a turbine disposed opposed to the pump from a side of the engine with respect to the pump;

a stator disposed between the pump and the turbine;

a multi-plate lockup clutch adapted to directly couple the turbine and the casing; and a lockup damper adapted to absorb shock during engagement of the lockup clutch, wherein the pump, the turbine and the stator define a torus which serves as a fluid working section for causing fluid within the casing to circulate therearound, and a part of the outer peripheral portion of a turbine shell being convexly curved toward the engine and being a widest region of the turbine shell, wherein the lockup clutch and the lockup damper being arranged laterally within a space between the torus and a surface of the casing on the side of the engine in such a manner that a part of the lockup clutch and the part of the outer peripheral portion of the turbine shell corresponding to the widest region being disposed to overlap with each other in an imaginary plane oriented perpendicular to a rotational axis of the lockup clutch, the lockup clutch being disposed entirely on a radially inner side with respect to the widest region of the turbine shell where an axial dimension of the turbine shell becomes largest, and the lockup damper being disposed entirely on a radially outer side with respect to the widest region of the turbine shell, the casing has a bulged portion in a radially intermediate part of a wall section closer to the engine, the bulged portion bulging toward the engine more than a radially inner part of the wall section, and the lockup clutch has a piston which is driven in an axial direction by an oil pressure, the piston being disposed only within a radial range of the bulged portion, the torque converter further comprising:

a fixed plate member attached onto an inner surface of the wall section of the casing on a radially inner side of the lockup clutch; and an oil passage formed between the wall section of the casing and the plate member so as to supply therethrough a working pressure to the piston, the fixed plate member having an outer peripheral end extending to a position within the bulged portion, and an end of the piston located furthest away from the engine being disposed closer to the engine than an end of the fixed plate member located furthest away from the engine.

16. The torque converter according to claim 15, wherein an entirety of the piston and the outer peripheral end of the fixed plate member are housed within the bulged portion.

17. The torque converter according to claim 16, wherein a ratio D1/D2 is set in a range of 1.5 to 1.6, where D1 is an outer diameter of the torus, and D2 is an inner diameter of the torus, and the lockup clutch is engaged when a speed ratio is not less than 0.3 and less than 1, where the speed ratio is a ratio of a rotation speed of the turbine to a rotation speed of the pump.

18. A torque converter comprising:

a casing coupled to an output shaft of an engine;

a pump disposed within the casing and adapted to be rotated integrally with the casing;

a turbine disposed opposed to the pump from a side of the engine with respect to the pump;

a stator disposed between the pump and the turbine;

a multi-plate lockup clutch adapted to directly couple the turbine and the casing; and a lockup damper adapted to absorb shock during engagement of the lockup clutch, wherein the pump, the turbine and the stator define a torus which serves as a fluid working section for causing fluid within the casing to circulate therearound, and a part of the outer peripheral portion of a turbine shell being convexly curved toward the engine and being a widest region of the turbine shell, wherein the lockup clutch and the lockup damper being arranged laterally within a space between the torus and a surface of the casing on the side of the engine in such a manner that a part of the lockup clutch and the part of the outer peripheral portion of the turbine shell corresponding to the widest region being disposed to overlap with each other in an imaginary plane oriented perpendicular to a rotational axis of the lockup clutch, the lockup clutch being disposed entirely on a radially inner side with respect to a widest region of the turbine shell where an axial dimension of the turbine shell becomes largest, and the lockup damper being disposed entirely on a radially outer side with respect to the widest region of the turbine shell, a ratio D1/D2 is set in a range of 1.5 to 1.6, where D1 is an outer diameter of the torus, and D2 is an inner diameter of the torus, and the lockup clutch is engaged when a speed ratio is not less than 0.3 and less than 1, where the speed ratio is a ratio of a rotation speed of the turbine to a rotation speed of the pump.

19. The torque converter according to claim 9, wherein the torque convertor is applied to a forward 6-speed type automatic transmission.

* * * * *